(12) United States Patent
Gambhir

(10) Patent No.: US 12,028,390 B2
(45) Date of Patent: Jul. 2, 2024

(54) INTELLIGENT MEETING MANAGEMENT

(71) Applicant: Microsoft Technology Licensing, LLC, Redmond, WA (US)

(72) Inventor: Prerana Dharmesh Gambhir, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/866,244

(22) Filed: Jul. 15, 2022

(65) Prior Publication Data

US 2024/0022618 A1    Jan. 18, 2024

(51) Int. Cl.
G06F 3/048     (2013.01)
G06F 3/0482    (2013.01)
H04L 65/403    (2022.01)
G06F 3/04817   (2022.01)

(52) U.S. Cl.
CPC .......... *H04L 65/403* (2013.01); *G06F 3/0482* (2013.01); *G06F 3/04817* (2013.01)

(58) Field of Classification Search
CPC ... G06F 3/04817; G06F 3/0482; H04L 65/403
See application file for complete search history.

(56) References Cited

U.S. PATENT DOCUMENTS

| 9,420,108 | B1 | 8/2016 | Bostick et al. |
| 10,445,706 | B2 | 10/2019 | Kitada et al. |
| 11,216,787 | B1 | 1/2022 | Shetty |
| 11,336,706 | B1 | 5/2022 | Saito et al. |
| 2010/0205542 | A1* | 8/2010 | Walman ............... G06Q 30/02 709/204 |

(Continued)

FOREIGN PATENT DOCUMENTS

WO    2022052084 A1    3/2022

OTHER PUBLICATIONS

"Non Final Office Action Issued in U.S. Appl. No. 17/672,474", dated Dec. 8, 2022, 25 Pages.

(Continued)

*Primary Examiner* — Claudia Dragoescu
(74) *Attorney, Agent, or Firm* — Novo TechIP International PLLC

(57) ABSTRACT

A system and method and for detecting meeting participant inattentiveness during an online meeting includes retrieving meeting content data from the ongoing online meeting, meeting metadata associated with the online meeting, and user data associated with participants of the online meeting, the online meeting being conducted via an online meeting application, the user data including camera data and data about user interactions with applications other than the online meeting application. Participant inattentiveness is detected, based on at least one of the camera data or the data about user interactions with the applications other than the online meeting application. Upon detecting participant inattentiveness, notification data is provided for display to the inattentive participant, receiving an indication of the participant's return to the online meeting, and providing data for displaying a summary of meeting events that occurred during the time period to the participant.

20 Claims, 10 Drawing Sheets

(56) References Cited

U.S. PATENT DOCUMENTS

| | | | | |
|---|---|---|---|---|
| 2011/0128151 | A1* | 6/2011 | Asad | A61B 5/168 340/573.1 |
| 2012/0284640 | A1* | 11/2012 | Sloyer | G06Q 10/10 715/753 |
| 2013/0263017 | A1* | 10/2013 | Moyers | G06F 16/284 715/753 |
| 2014/0229218 | A1 | 8/2014 | Abuelsaad et al. | |
| 2016/0182580 | A1 | 6/2016 | Nayak | |
| 2018/0077099 | A1 | 3/2018 | Silva et al. | |
| 2018/0191907 | A1 | 7/2018 | Herrin et al. | |
| 2018/0218734 | A1 | 8/2018 | Somech et al. | |
| 2018/0232114 | A1* | 8/2018 | Saunshi | G06F 3/04817 |
| 2019/0273767 | A1 | 9/2019 | Nelson et al. | |
| 2019/0340554 | A1 | 11/2019 | Dotan-cohen et al. | |
| 2019/0378076 | A1* | 12/2019 | O'Gorman | H04M 3/56 |
| 2020/0145530 | A1 | 5/2020 | Renner et al. | |
| 2020/0279567 | A1 | 9/2020 | Adlersberg et al. | |
| 2020/0374146 | A1* | 11/2020 | Chhabra | H04L 12/1822 |
| 2020/0403816 | A1 | 12/2020 | Daredia et al. | |
| 2020/0403817 | A1 | 12/2020 | Daredia et al. | |
| 2021/0111916 | A1 | 4/2021 | Velayutham et al. | |
| 2021/0399911 | A1 | 12/2021 | Jorasch et al. | |
| 2022/0157058 | A1* | 5/2022 | Raethke | G06V 10/454 |
| 2022/0337443 | A1* | 10/2022 | Sood | G06F 16/735 |
| 2023/0261890 | A1 | 8/2023 | Religa et al. | |

OTHER PUBLICATIONS

"Notice of Allowance Issued in U.S. Appl. No. 17/672,474", dated Apr. 17, 2023, 3 Pages.

"International Search Report and Written Opinion Issued in PCT Application No. PCT/US22/050817", dated Mar. 17, 2023, 12 Pages.

"Notice of Allowance Issued in U.S. Appl. No. 17/672,474", dated Mar. 22, 2023, 10 Pages.

"International Search Report and Written Opinion Issued in PCT Application No. PCT/US23/025093", dated Sep. 4, 2023, 10 Pages.

U.S. Pat. No. 11,729,009, Aug. 15, 2023, Religa, et al.

* cited by examiner ns with the one or more applications other than the online meeting application, that one of the participants has been inattentive to the online meeting for a time period exceeding a threshold; upon detecting that the one of the meeting participants has been inattentive for the time period, providing notification data for display to the one of the meeting participants, the notification data notifying the one of the meeting participant of their inattentiveness; in response to providing notification data for display, receiving an indication of the one of the meeting participants return to the online meeting; and providing data for displaying a summary of meeting events that occurred during the time period to the one of the meeting participants.

INTELLIGENT MEETING MANAGEMENT

BACKGROUND

With the increased use of remote and flexible work and learning environments, virtual meetings have become a common occurrence for many users. As a result, the number of meetings many users are invited to has significantly increased. This often results in users attending back-to-back online meetings. As a result, with the many meetings being scheduled on a daily basis, a significant portion of some users' day is overtaken by meetings. This often results in some users' inability to stay attentive during meetings due to fatigue or information overload. Furthermore, to balance the need to participate in portions of meetings that are important to them, many users join meetings and try to follow what occurs at the meeting, while at the same time, working on other projects. However, this may result in the user being distracted by the task they are working on and not being able to identify important events that occur during a meeting.

Hence, there is a need for improved systems and methods of intelligently managing meetings by monitoring meeting content and providing meeting highlights that enable context retention, when needed.

SUMMARY

In one general aspect, the instant disclosure presents a data processing system having a processor and a memory in communication with the processor wherein the memory stores executable instructions that, when executed by the processor, cause the data processing system to perform multiple functions. The function may include retrieving meeting content data from an ongoing online meeting, meeting metadata associated with the online meeting, and user data associated with one or more participants of the online meeting, the online meeting being conducted via an online meeting application, and the user data including at least one of camera data and data about user interactions with one or more applications other than the online meeting application; detecting, based on at least one of the camera data or the data about user interactions with the one or more applications other than the online meeting application, that one of the participants has been inattentive to the online meeting for a time period exceeding a threshold; upon detecting that the one of the meeting participants has been inattentive for the time period, providing notification data for display to the one of the meeting participants, the notification data notifying the one of the meeting participant of their inattentiveness; in response to providing notification data for display, receiving an indication of the one of the meeting participants return to the online meeting; and providing data for displaying a summary of meeting events that occurred during the time period to the one of the meeting participants.

In yet another general aspect, the instant disclosure presents a method for detecting meeting participant inattentiveness during an online meeting. In some implementations, the method includes retrieving meeting content data from the ongoing online meeting, meeting metadata associated with the online meeting, and user data associated with one or more participants of the online meeting, the online meeting being conducted via an online meeting application, and the user data including at least one of camera data and data about user interactions with one or more applications other than the online meeting application; detecting, based on at least one of the camera data or the data about user interac- In a further general aspect, the instant disclosure presents a data processing system having a processor and a memory in communication with the processor wherein the memory stores executable instructions that, when executed by the processor, cause the data processing system to perform multiple functions. The function may include retrieving meeting content data from an ongoing online meeting, meeting metadata associated with the online meeting, and user data associated with one or more participants of the online meeting; identifying in real time, based on at least one of the meeting content data, meeting metadata and the user data, one or more meeting events that occur during the online meeting for inclusion in a meeting summary visualization; and generate based on the identified meeting events, display data for displaying the meeting summary visualization, wherein the meeting summary visualization includes a visualization bar for visualizing a time duration of the online meeting and an icon for each of one or more identified meeting events, each icon being displayed adjacent to the visualization bar at a location corresponding to a time at which the identified meeting event associated with the icon occurred.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
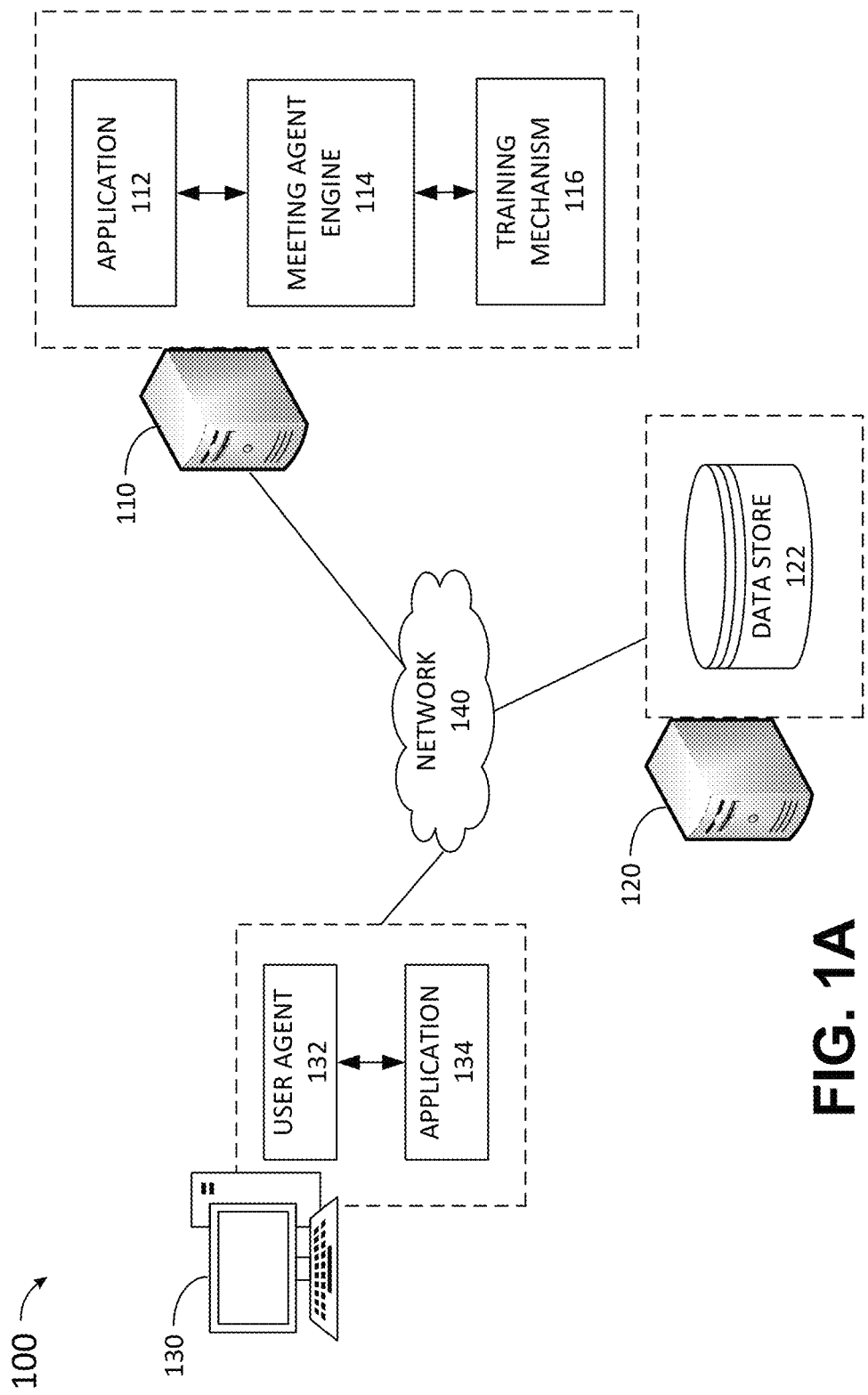
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

With the recent increase in remote collaboration, users are experiencing a significant increase in use of virtual meetings. As a result, daily virtual meeting time for many users has substantially increased. This often results in overlapping meeting times, back-to-back meetings and/or meetings taking up a significant amount of productive time from users. These events often result in meeting attendees losing focus during a meeting or needing to attend to other tasks while the meeting is taking place. Sometimes, a user is not aware that they have stopped paying attention or they are not aware of the amount of time passed since they last paid attention to the meeting. This can result in embarrassing situations where the user's attention may be needed while they lost focus, or the user may miss important information. Thus, there exists a technical problem of lack of adequate mechanisms for monitoring meetings to determine when a user has been inattentive for a given time period and providing a notification to the user to regain their attention to mitigate user inattention during virtual meetings.

Moreover, when a meeting attendee becomes inattentive during a meeting, they may miss important information or occurrences at the meeting, thus losing context. As a result, it may become difficult for them to follow the meeting once their attention is returned to the meeting. Furthermore, if the user is unable to return their attention to the meeting before the meeting ends or is unable to attend the meeting, they will have no knowledge of important conversations, documents shared, reactions or other occurrences during the meeting. While the user may be able to later watch a recording of the meeting, if one exists, that may be too time-consuming and inefficient, particularly if the user lost focus for a short period of time. Watching the recording may require searching for the exact point in time in which they lost focus or having to rewatch the whole recording. Thus, there exists a technical problem of lack of adequate mechanisms for users to be retrain context of the meeting and be informed of important occurrences of the meeting during a period of time in which they lost focus.

To address these technical problems and more, in an example, this description provides technical solutions for intelligently monitoring virtual meetings, notifying a meeting attendee when they have been inattentive to a meeting for a given time period, providing a visual summary of significant occurrences during the meeting, and providing a more detailed summary of occurrences at the meeting during a meeting attendee's lack of attention to improve context retention. The technical solution includes real-time monitoring of meeting attendee's actions during a meeting (e.g., user eye tracking, user interaction with applications other the meeting application, etc.) to detect user inattention as well as monitoring of meeting content such as such as audio output from the online meeting, transcriptions of the audio input, content of documents shared during the online meeting, data regarding meeting attendee reactions, user information such as organizational graph data, chat data collected from the online meeting, screen content from the online meeting, the identity of participants, and any other metadata available from the virtual meeting. The technical solution utilizes one or more machine-learning models and/or logical mechanism to analyze the collected data and detect when a meeting participant has been inattentive for a given time period, and to identify important occurrences at the meeting, and create a visual event timeline for the meeting in real-time. When it is determined that a meeting attendee has been inattentive for a given time period, the technical solution includes providing a notification to the meeting attendee. Upon returning their attention to the meeting, the meeting attendee may be presented with a meeting summary card which provides a summary of occurrences at the meeting during the meeting attendee's inattention. In some implementations, the user is able to manage the notifications. For example, a snooze feature may be provided to temporarily disable notifications or an option may be provided to turn off notifications, when not wanted. Recorded highlights of the meeting can be provided in the meeting itself and/or after the meeting has ended such as in the associated meeting chat. In this manner, the technical solution provides an easy-to-use mechanism to detect and mitigate user inattention during virtual meetings and to enable an inattentive user to quickly learn of important occurrences of the meeting during their inattention. This significantly improves meeting quality and time management for meeting participants and increases user satisfaction.

The technical solution described herein addresses the technical problem of detecting and mitigating user inattention during virtual meetings and achieves technical effects by providing a system and method for automatically monitoring user actions and meeting content in real-time to notify users of their inattention and to provide the users with a summary of meeting content they may have missed. The technical solution automatically detects and informs the user when their attention drifts elsewhere during a meeting, allows the user to quickly activate the meeting screen and quickly and efficiently access data relevant to an ongoing meeting in real-time or in an easily decipherable manner which does not take significant screen space and therefore improves graphical user interfaces for electronic devices. The technical effects at least include (1) improving the efficiency of using an electronic device to attend a virtual meeting by automatically monitoring and detecting user inattention during a meeting and notifying users of their inattention; (2) improving virtual meeting quality by monitoring meeting content and brining relevant meeting content to the user's attention in an efficient manner; (3) improving the viewer's navigation speed for locating important occurrences at the meeting; and (4) increasing relevancy and flexibility of meeting data displayed to the viewer on the meeting screen.

As will be understood by persons of skill in the art upon reading this disclosure, benefits and advantages provided by such implementations can include, but are not limited to, a technical solution to the technical problems of lack of mechanisms for efficient and user-friendly detection and mitigation of user inattentiveness during online meetings and enabling context retention when users lose focus. Technical solutions and implementations provided herein offer a mechanism for automatically monitoring user actions and meeting content and notifying users who have been inattentive for a given time period. The benefits made available by these technology-based solutions provide a user-friendly mechanism for automatically staying focused in a meeting and reengaging with the meeting in an efficient and easy manner.

As used herein, the terms "online meeting," or "virtual meeting" may refer to a meeting or an audio/video conference conducted via an electronic device. The term "meeting attendee" or "meeting participant" may refer to any person who attends at least a portion of an online meeting. The term meeting summary or meeting highlights may refer to a summary of events occurring during a meeting that have been detected as being important or relevant.

FIG. 1A illustrates an example system 100, upon which aspects of this disclosure may be implemented. The system 100 may include a server 110, which may itself include an application 112, a meeting agent engine 114 and a training mechanism 116. While shown as one server, the server 110 may represent a plurality of servers that work together to deliver the functions and services provided by each engine or application included in the server 110. The server 110 may operate as a cloud-based server for offering meeting agent services in one or more applications such as application 112 and/or application 134. The server 110 may also operate as a shared resource server located at an enterprise accessible by various computer client devices such as a client device 130.

The server 110 may include and/or execute a meeting agent engine 114, which may receive a request for monitoring and analyzing an online meeting from an application such as the application 112 or 134 and may process the request by retrieving various types of data about the online meeting. The data may include user data (e.g., user camera and activity data), audio and/or video data from the online meeting, transcription data from a transcription service, metadata such as the list of meeting invitees, active meeting participants, meeting type, meeting topic, documents shared in the meeting, meeting chat content, participant reactions during the meeting, associations between meeting invitees and the like. The meeting agent 114 may provide the retrieved information to one or more engines and ML models for analyzing user actions to detect when the user is inattentive for a given time period. The meeting agent 114 may also provide the retrieved information to one or more engines and ML models for analyzing the content to detect important meeting events and to create a visual meeting summary. The request to monitor a meeting may be transmitted to the meeting agent engine 114 when an online meeting begins and the applications 112 or 134 determine that one or more meeting attendees have requested and/or consented to receiving notifications regarding their inattentiveness. Alternatively, the request may be transmitted for all meetings or certain types of meeting that are determined to have a specific significance or importance. The request may be transmitted automatically via the application 112 or 134. The meeting agent engine 114 may be executed in the background.

The meeting agent engine 114 may include separate modules for processing the camera data, as well as the meeting audio, video and textual inputs. Furthermore, the meeting agent engine 114 may include a separate element for comparing the output of the various modules to detect occurrence of an important meeting event. One or more modules and elements of the meeting agent engine 114 may include one or more ML models. The internal structure of and data flow between the various elements of the meeting agent engine 114 are discussed in greater detail with respect to FIG. 1B.

One or more ML models implemented by the meeting agent engine 114 may be trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. The initial training may be performed in an offline stage. Additionally, and/or alternatively, the one or more ML models may be trained using batch learning.

As a general matter, the methods and systems described herein may include, or otherwise make use of one or more ML model to perform image processing to detect user inattentiveness and natural language processing (NPL) processing to detect important meeting events. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activities, determine associations between various words and users, and identify keywords and/or classify content. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 may include a server 120 which may be connected to or include the data store 122 which may function as a repository in which databases relating to training models, organization graph data and/or meeting data may be stored. Although shown as a single data store, the data store 122 may be representative of multiple storage devices and data stores which may be accessible by one or more of the meeting agent engine 114, training mechanism 116, and application 112.

The client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134) that allow the user to participate in an online meeting. Examples of suitable client devices 130 include but are not limited to personal computers, desktop computers, laptop computers, mobile telephones, smart phones, tablets, phablets, smart watches, wearable computers, gaming devices/computers, televisions; and the like. The internal hardware structure of a client device is discussed in greater detail with respect to FIGS. 5 and 6.

The client device 130 may include a local application 134. The application 134 may be a computer program executed on the client device that configures the device to be responsive to user input to allow a user to participate in an online meeting. Examples of suitable applications include, but are not limited to, a video conferencing application (e.g., Microsoft Teams), a collaborative work application, and a communications application.

In some examples, the application used to participate in an online meeting is executed on the server 110 (e.g., application 112) and provided via an online service. In some implementations, web applications communicate via the network 140 with a user agent 132, such as a browser, executing on the client device 130. The user agent 132 may provide a user interface that allows the user to interact with the application 112. User data from the application 134 or application 112 may be provided via the network 140 to the meeting agent engine 114 for use in providing meeting assistance.

Figure 1B:
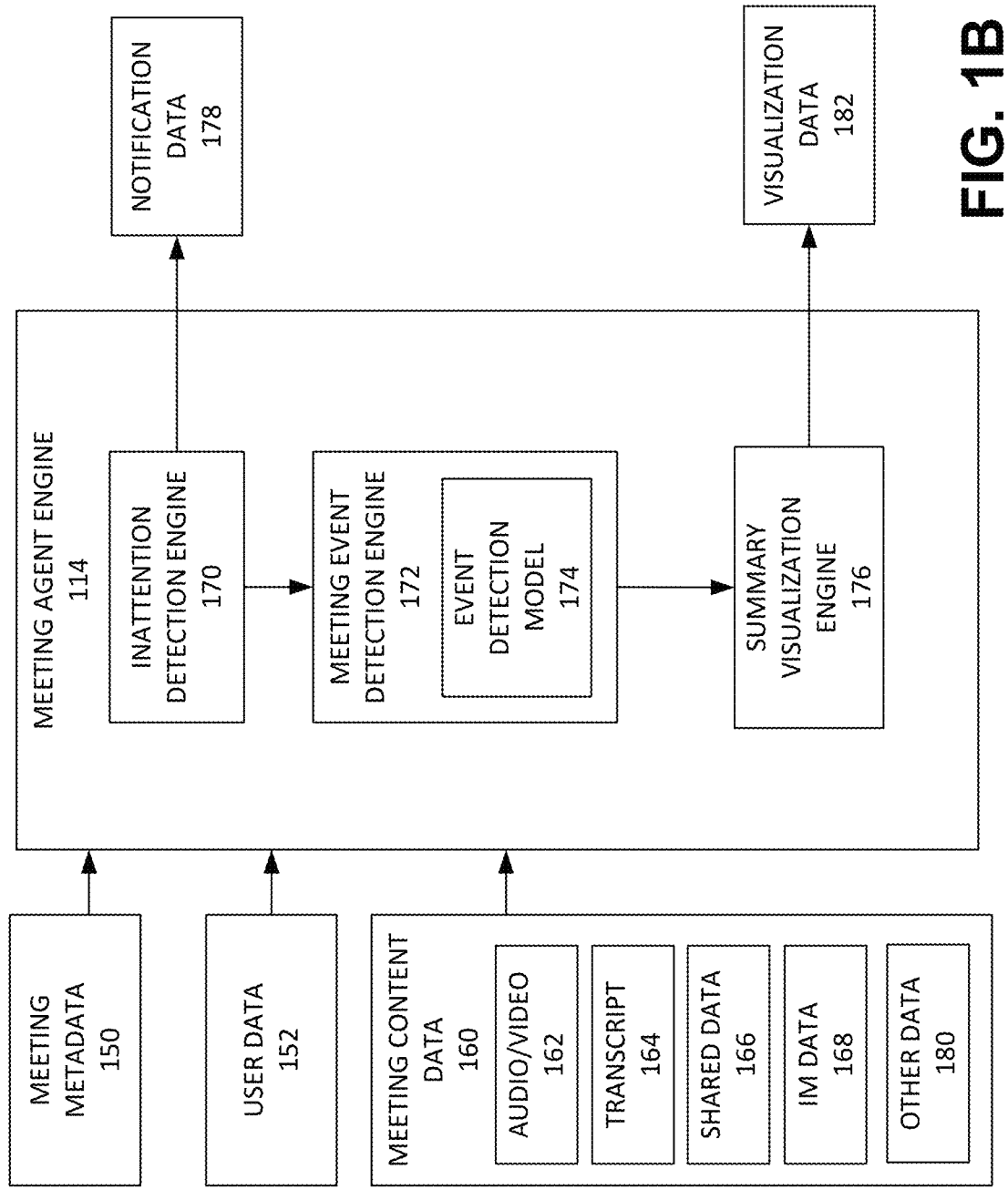
FIG. 1B depicts an example data flow between some elements of an example system upon which aspects of this disclosure may be implemented.

FIG. 1B depicts an example data flow between some of the elements of the example system 100. The meeting agent engine 114 may include an inattention detection engine 170, a meeting event detection engine 172, and a summery visualization engine 176. In some implementations, a request to monitor and manage an online meeting is received by the meeting agent engine 114 when an online meeting begins. In an example, a request to monitor and/or manage a meeting is received by the meeting agent engine 114, when a meeting invitee and/or meeting attendee submits a request to receive notifications for a meeting. This may occur when the meeting invitee receives and/or reviews the meeting invitation or when a meeting invitee joins the meeting. The request may also be received by the meeting agent engine 114, when any online meeting begins. The request may be transmitted by the applications 112/134 of FIG. 1A.

Once the request to monitor an online meeting is received, the meeting agent engine 114 may retrieve various data relating to the meeting. The data may include meeting metadata 150, user data 152 and meeting content data 60. Meeting metadata may refer to any metadata available for online meetings and may include meeting time/date, meeting duration, list of meeting invitees, list of meeting attendees, meeting title, meeting organizer, and type of meeting (e.g., work related, social meeting, educational meeting, etc.). This information may be retrieved from the application used to conduct the meeting and/or the application used to schedule the meeting. In some implementations, the metadata information is available in the substrate.

User data 152 may refer to information about meeting attendee's activities during the meeting such as camera data or data indicating whether the application is an active window on the user's device. This may include image and/or video data from a camera associated with the client device used by each user to attend the meeting. The data may also include data from the client device's pointer (e.g., mouse) or other data that indicates whether the online meeting is an active window on the user's client device. The user data 152 may also include users' roles in the organization, and their associations with one another. In some implementations, this information is received from an organizational graph that stores information about various users in an organization. The information may include a user's job title, job duties, active projects, the people they normally work with, their organizational associations with other users (e.g., their manager, the people they manage) and the like. This information may be used to determine importance/relevance of meeting events.

The meeting content data 160 may include various types of content collected during the online meeting. In some implementations, the meeting content data 160 includes audio/video data 162 which may include audio and/or video signal collected during the meeting. This data may be used to detect keywords that indicate importance or relevance of meeting events and discussions. In some implementations, the audio/video data 162 is used to transcribe the meeting. In other implementations, a separate transcription service is used for transcribing the content of the meeting from speech to text. The transcript data 164 may then be transmitted to the meeting agent engine 114 for use in monitoring the meeting. The transcript data 164 may be provided in real time and may include information about the speaker (e.g., use identifier), transcript of the spoken words and/or a timestamp.

The meeting content data 160 may also include shared data 166, instant messaging (IM) data 168 and other data 180. The shared data 166 may refer to content data from any documents that are shared or presented during the meeting. For example, the shared data 166 may include content of a presentation (e.g., one or more slides) presented during the meeting or pages of a document shown in the meeting. IM data 168 may refer to any messages exchanged by meeting attendees during the meeting via an IM feature of the online meeting. In an example, the application executing the online meeting provides a chat feature for users to transmit a textual message to one or more meeting attendees during the meeting. Any such messages may be collected and provided to the meeting agent engine 114 as part of IM data 168. Other data 180 may include any other data collected during the meeting. Examples of such data include screen data from the meeting which may include user reactions (e.g., emoticons), detected user gestures, and the like.

Once all the required data is received, the meeting agent engine 114 may transmit the data to various modules to monitor and manage the meeting. In some implementations, the user data 152 is transmitted to the inattention detection engine 170 to detect when a meeting attendee becomes inattentive. This may involve examining camera data and using one or more ML models to analyze the user's facial features and/or eye movement to determine if the user is looking at the screen or looking elsewhere. The camera data may also be examined to determine when the user becomes unavailable (e.g., the user is not on the camera screen), or the user's head is turned away from the screen for a time period that exceeds a predetermined threshold. The inattention detection engine 170 may utilize one or more ML model trained for tracking eye movements, user position and the like to detect when a user is not paying attention to the screen.

When camera data is unavailable and/or in addition to the camera data, the inattention detection engine 170 may examine user activity data from the user's client device to determine if the user is interacting with applications other than the virtual meeting application. For example, if the user is interacting with other applications on a multiscreen display device or if the virtual meeting application is in the background while other applications are in the foreground, the user data 152 may provide an indication that the user's attention is elsewhere. This information may indicate that the user has become inattentive to the meeting, even if the user's eye movements indicate that the user is viewing the screen. To ensure compliance with privacy guidelines, the information about user activities may simply provide an indication that the user is active with applications other than the virtual meeting application or that the virtual meeting application is in the background.

To ensure notification is only provided, when needed, the inattention detection engine 170 may calculate the amount of time the user has been inattentive (e.g., has been looking away from the screen). This may be done by determining the time (e.g., examining the timestamp) at which the user stops paying attention and examining user data to keep track of how long the user continues to be inattentive. When the calculated amount of time exceeds a threshold, the inattention detection engine 170 may generate notification data 178 indicating that the user has been inattentive. The threshold may be predetermined or may vary based on the user, importance of the meeting and the like. In some implementations, the threshold may be adjustable by the user. For example, the user may be able to set the amount of time they can be inattentive before receiving a notification (e.g., 2 minutes, 5 minutes, etc.). In some implementations, a default threshold is set by the system (e.g., 30 seconds), which may be changeable by the user or based on other parameters.

The notification data may simply be a flag transmitted to the client device of the inattentive user indicating that the user has been inattentive for a given time period. In some implementations, the notification data may include display data for displaying to the user and may include the amount of time. For example, the display data may include textual data that indicates that the user has been inattentive for the given time period and enables the user to return to the virtual meeting application screen. For example, a user interface (UI) element may be displayed that includes a menu option for enabling activation of the virtual meeting application. The UI element may be displayed on the virtual meeting application screen and/or may be a taskbar notification element.

When the inattentive detection engine 170 determines that the user has been inattentive for a given time period, it may transmit a signal to the meeting event detection engine 172 to detect meeting events for the duration of the user's inattentiveness. In some implementations, the meeting event detection engine 172 operates concurrently with the inattentive detection engine 170 as meeting content data 160 related to the meeting begins to arrive. In such implementations, the meeting event detection engine 172 receives, processes the meeting content data 162 and detects important and/or relevant meeting events regardless of meeting attendee attentiveness. In this manner, a summary of meeting events can be displayed for the meeting anytime one of the meeting attendees transmits a request for display of the meeting event summaries and/or anytime an inattentive meeting attendee returns to the meeting.

The meeting event detection engine 172 may receive and examine the meeting metadata 150, user data 152 and/or meeting content data 160 to identify events occurring during the meeting that may be of importance to the meeting or to a specific meeting attendee. To achieve this, the meeting event detection engine 172 may make use of one or more classifiers, rule-based elements and/or ML models. In an example, transcript data 164 may be examined to detect occurrence of specific keywords that indicate importance. These keywords may be supplied to the meeting event detection engine 172 and may be updated based on user feedback. For example, keywords such as significant, important, urgent, cost, due date, task, past due, finance, budget and the like may be identified and used by the meeting event detection engine 172 to detect important statements made during the meeting. In some implementations, different keyword lists may be used for different types of meetings. For example, the type of meeting may be detected from the meeting topic or the relationship between the meeting participants (e.g., family members indicates social meeting, while coworkers indicates work meeting) and different keyword lists may be used for the different identified types of meetings. Presence of one or more of the keywords in the transcript data may lead to identifying the portion of the transcript as an important statement. The sentence or statement including the keyword(s) may then be identified as an important event for inclusion in the meeting summary visualization.

In addition to transcript data 166, other meeting content data may also be examined to detect important meeting events. This may involve utilizing one or more ML models such as the event detection model 174. The event detection model 174 may receive the meeting content data 160, meeting metadata 150 and/or user data 152 as inputs and may provide detected meeting events as an output. Important events may include statements made by one or more meeting attendees during the meeting, documents shared during the meeting, reactions made by the meeting attendees, important messages sent via a chat feature (e.g., links shared), task lists generated and the like.

To identify important statements made during the meeting, in addition to presence of keywords, the event detection model 174 may examine data such as the number and type of reactions to a statement to determine importance of the statement (e.g., if more than 20% of the meeting attendees react to a statement). The event detection model 174 may also take into account the title and/or relevance of the speaker to the meeting (e.g., the speaker is the meeting organizer, company CEO, team leader, etc.). In some implementations, any document shared during the meeting may be identified as a meeting event. However, if many documents are shared during the meeting, an algorithm may be used to identify which ones are important enough for display in the meeting summary. The algorithm may examine parameters such as the amount of time spent on the shared document, the person who shared it, the number of reactions to it and the like. Statements made in the chat may be examined in a similar manner as spoken statements to identify important statements for display. To determine which meeting attendee reactions to include in the meeting event summary, parameters such as the number and type of reaction, the title or position of the person making the reaction and the like may be taken into account.

To identify meeting events that qualify as important events, the event detection model 174 may use weights for different parameters and may utilize a ranking module that ranks the meeting events based on a calculated confidence score. In some implementations, to ensure more detailed information can be provided for a period of the meeting during which a user becomes inattentive, every meeting event is identified and tracked in chronological order. These meeting events may include sharing of a document, a user reaction (e.g., via a detected gesture or emoticon), the beginning and end time of each speaker's speaking time, messages exchanged in chat, links shared, task lists generated, and the like. When meeting events are being generated to be displayed to an inattentive user for the duration of their inattentiveness, some events that may not qualify as important may still be included in the listed meeting events. This is because, since meeting events are being generated for a shorter time period and are used to inform the user of events during their inattentiveness, more detail may be needed.

The identified meeting events along with their corresponding information may be transmitted to a summary visualization engine 176 for generating a visualization element for display to the user. The summary visualization engine 176 may utilize the information provided regarding each meeting event to create a chronological visualization element for the events. The visualization may include information such as user identification information (e.g., meeting attendee name, meeting attendee initials, and/or meeting attendee thumbnail picture) on the visualization element to identify the user responsible for each meeting event. When multiple users contribute to a meeting event (e.g., user reactions), instead of identifying each user, the number of users may be displayed on the visualization element. To ensure that the visualization element provides a brief overview and is not too confusing and overwhelming, an event may be displayed on the visualization element with minimal information. For example, an important statement made by a meeting attendee may simply be identified by a dot on the visualization timeline that is shown below the speaker's thumbnail picture. More information about the event, however, may be obtained by hovering over or clicking on each event, as further discussed below. Thus, the summary visualization engine 176 may receive the detected meeting events as an input and provide the visualization data 182 as an output for display by the virtual meeting application. It should be noted that event detection and visualization occur in real time. As such, as the meeting progresses, the visualization element may be updated to add additional events. While the visualization summary is created in real-time and may be provided during the meeting, the visualization data 182 may be stored and utilized by meeting attendees or others, after a meeting has concluded. For example, the visualization summary may be made available via the chat feature after the meeting has ended.

Figure 1C:
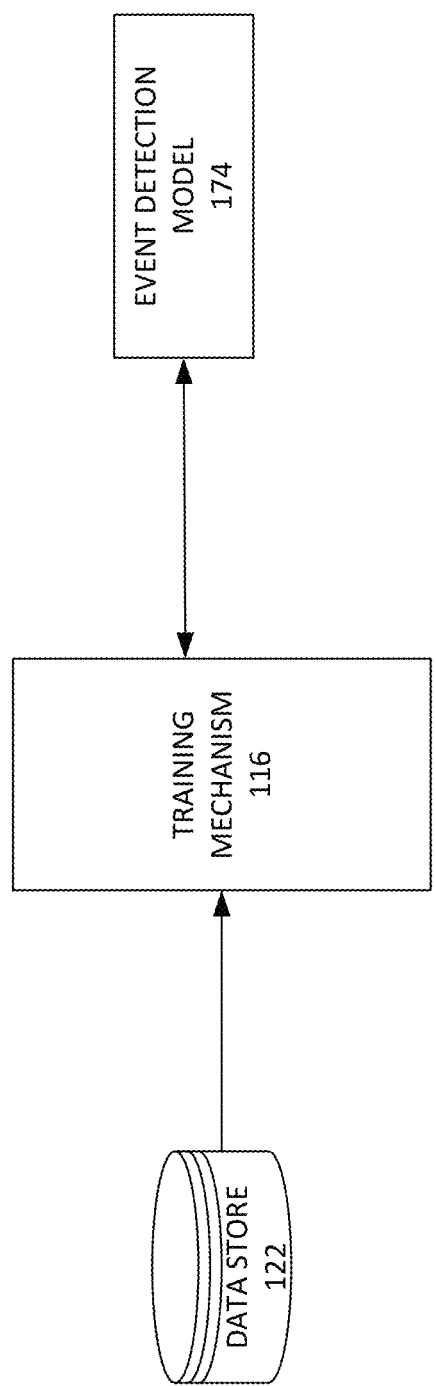
FIG. 1C how one or more machine-learning (ML) models used by a meeting agent engine may be trained.

FIG. 1C depicts how one or more ML models used by the meeting agent engine 114 may be trained by using the training mechanism 116. The training mechanism 116 may use labeled training data sets stored in the data store 122 to provide initial and ongoing training to the event detection model 170, and/or any models used by the inattentive detection engine 176. In some implementations, a training dataset which includes labeled meeting content and corresponding meeting events may be used to train the event detection model 170.

The event detection model 170 may be trained using labeled data collected from meeting transcripts. The data may be labeled by extracting lines from the transcript that correspond to important meeting events. In some implementations, to provide ongoing training, the training mechanism 116 may use training data sets received from the ML models. Furthermore, data may be provided from the training mechanism 116 to the data store 122 to update one or more of the training datasets in order to provide updated and ongoing training. Additionally, the training mechanism 116 may receive training data such as knowledge from other pretrained mechanisms.

Figure 2A:
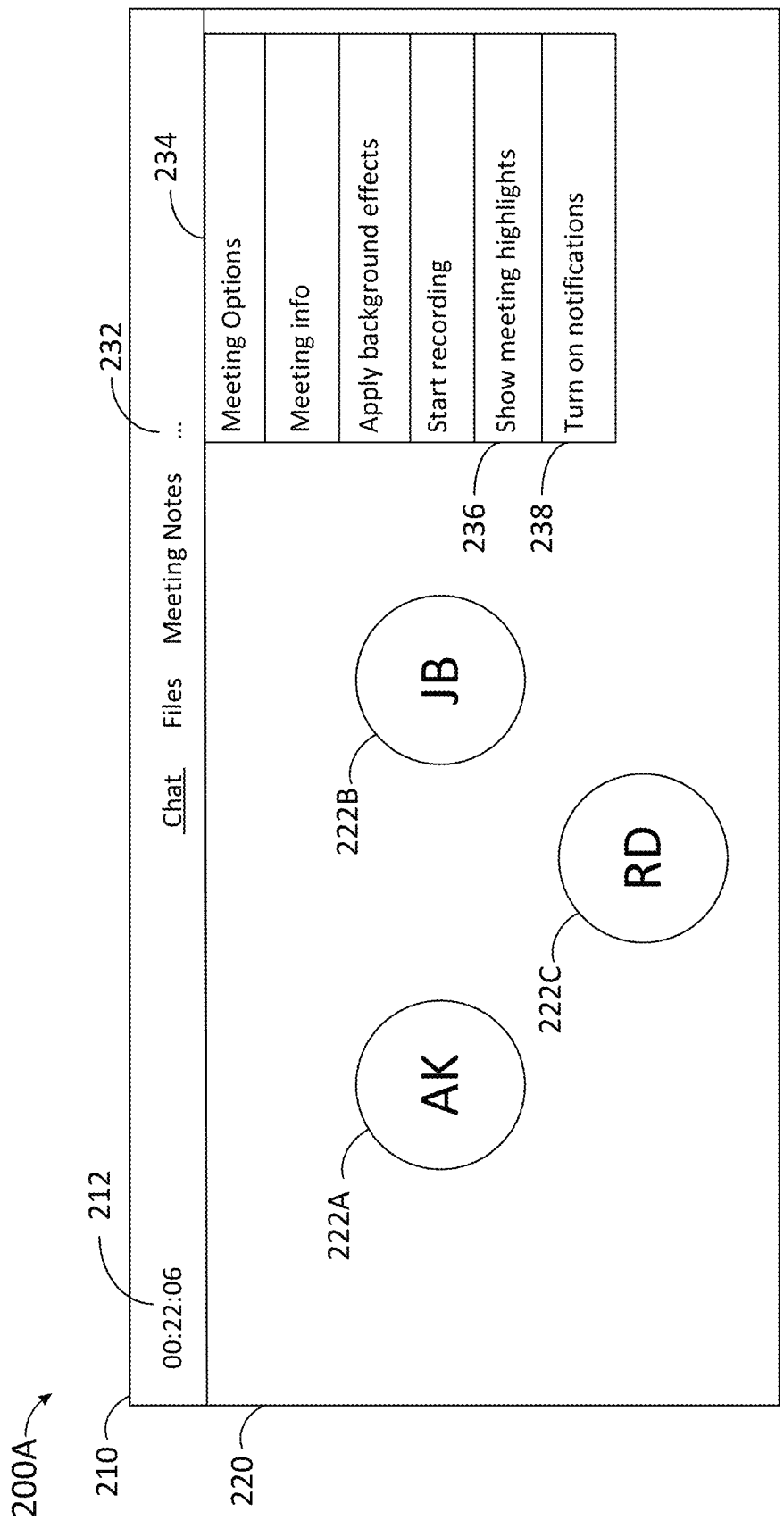
FIGS. 2A-2B depict example graphical user interface (GUI) screens of an application or service that provides meeting monitoring, notification and/or summarization services.
Figure 2B:
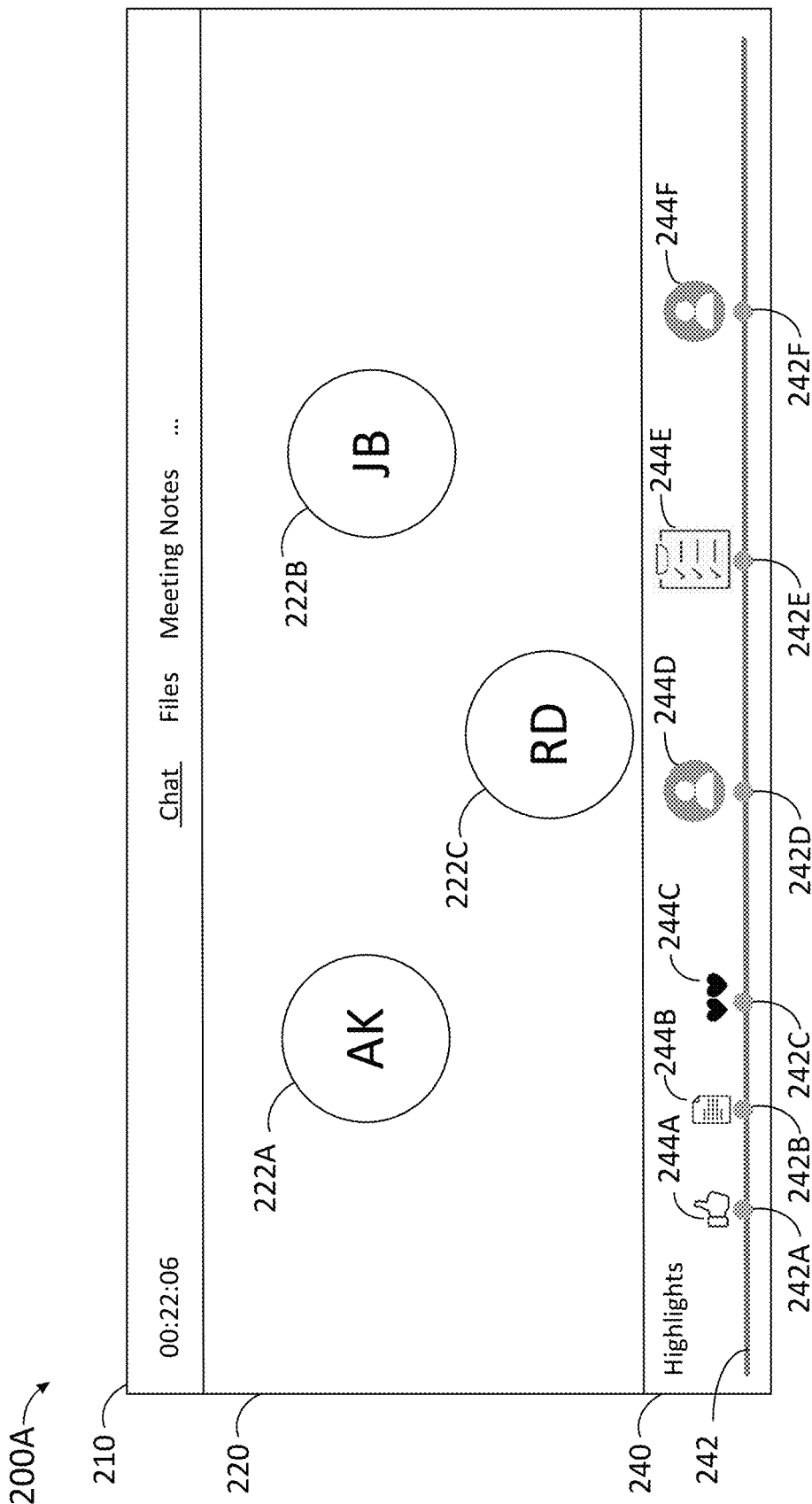

FIGS. 2A-2B depict example GUI screens of an application or service that provides meeting monitoring, notification and/or summary visualization services. FIG. 2A depicts an example GUI screen 200A of an online meeting application (e.g., Microsoft Teams). GUI screen 200A may be displayed by an online meeting application when a meeting is in progress. In an example, the GUI screen 200A is displayed to users are participating in the meeting. The user may be represented by icons 222A-222C. When each of the users represented by the icons 222A-222C have enabled their cameras, instead of the icons, a live video of the user may be displayed in the UI element 220 of the GUI screen 200A.

The GUI screen 200A may include a toolbar menu 210 displaying a time indication 212, which depicts the period of time since the meeting started, as well as various menu tabs for performing a variety of tasks in the online meeting application. For example, the toolbar menu 210 may include a chat tab (which is selected in GUI screen 200A) for displaying instant messages exchanged during the meeting, a files tab for displaying the files uploaded for the meeting, and a meeting notes tab for displaying any notes provided for the meeting. The toolbar menu 210 may also include a UI element 232 for enabling display of a context menu 234 which contains various additional menu options for conducting tasks in the application. The menu options of the context menu 234 may include a menu option 236 for showing meeting highlights and a menu option 238 for turning on notifications. When the user choose to turn on notifications via the menu option 238, an additional UI element (e.g., a pop-up menu) may be displayed that various options for turning on different types of notifications. One of the options may allow the user to enable/disable notifications for inattentiveness. Additionally, menu options may be provided that enable the user to customize the time period of inattentiveness before a notification is displayed and/or the type of notification provided (e.g., toolbar notification, activate online meeting screen, etc.). In this manner, enabling/disabling inattentiveness notifications may be achieved during an active meeting. The online application may provide other options for enabling/disabling notifications. For example, the user may be able to enable inattentiveness notifications for all future meetings of the user. The user may also be allowed to enable/disable notifications when they select a future meeting (e.g., in a calendar).

When the menu option 236 is selected to display meeting highlights, the GUI screen 200B of FIG. 2B may be displayed. The GUI screen 200B includes a visualization pane 240 for displaying icons representing various meeting events that have occurred during the meeting. The visualization pane 240 may display the event icons in a chronological order with spaces that represent the amount of time passed between the events. The visualization pane 240 may include a visualization bar 242 representing the time duration of the meeting. Visual indications 242A-242F may be placed along the visualization bar 242 to identify the time at which meeting event occurs. An icon corresponding to the type of event may be displayed adjacent to the to the visual indications (e.g., above the visualization bar 242) to provide a quick visual summarization of the meeting events. For example, icon 244A may be displayed to represent a participant reaction. The reaction may have been received via the participant's express input (e.g., clicking on the emoticon) or via gesture detection. When more than one of the same type of reaction is received at a given time period, multiple icons may be displayed to represent the multiple reactions. This is illustrated via icon 244C which displays two hearts. When the number of reactions exceeds a certain threshold, at which point displaying the numerous reactions may be size-prohibitive, a number may be displayed next to the icon to represent the number of reactions received. Other types of icons may represent other meeting events. For example, an icon 244B may be displayed to represent a document being shared during the meeting. A profile picture icon 244D or 244F may be displayed, when the meeting event is a statement made by one of the participants. The profile icons 244D and 244F may display a thumbnail picture of the meeting participant making the statement. Alternatively or when a profile picture is not available, other identifying information of the participant (e.g., name, initials, etc.) may be displayed. The icon 244E may be displayed to represent a task list being created. Other types of icons may be used for other meeting events. As discussed above, the meeting events displayed on the visualization bar 242 are those that have been identified as being important/relevant, based on various parameters. The meeting events may be detected and displayed on the visualization bar 242 in real time. As such, as the meeting progresses, more indications 242 and icons 244 may be added to the visualization bar 242. In some implementations, the size of the indications 242 and icons 244 may be adjusted to enable display of more events. Alternatively and/or additionally, scrolling mechanisms may be provided for scrolling through the meeting events, when the detected meeting events cannot fit within the available display space of the visualization pane 240.

In some implementations, the user may take certain actions with respect to the icons 244 (or may be provided other menu options) for receiving more information about a meeting event. In an example, hovering over or right-clicking on an icon 244 or indication 242 results in the display of additional information about the meeting event. For example, hovering over a reaction's icon (e.g., 244A and 244C) may display the name of the meeting participant making the reaction, the number of participants making the reaction, the time at which the reaction was received, and the like. Hovering over a participant statement may cause the display of a UI element which includes the statement. Similarly, hovering over a shared document may display the name of the person sharing the document and a link to the shared document, and the like. Access to additional information about the meeting events may be provided in other manners. For example, the visualization pane 240 may include a separate UI element for viewing more information about the displayed meeting events and the like.

Figure 3A:
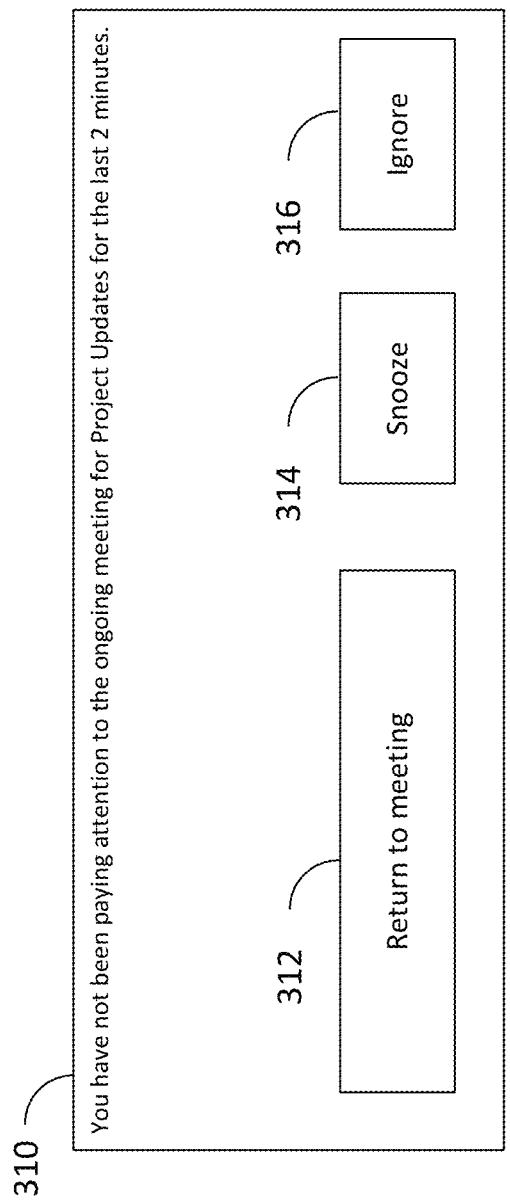
FIGS. 3A-3B depict example GUI screens for providing notifications and meeting summary visualizations to an inattentive user during a meeting.
Figure 3B:
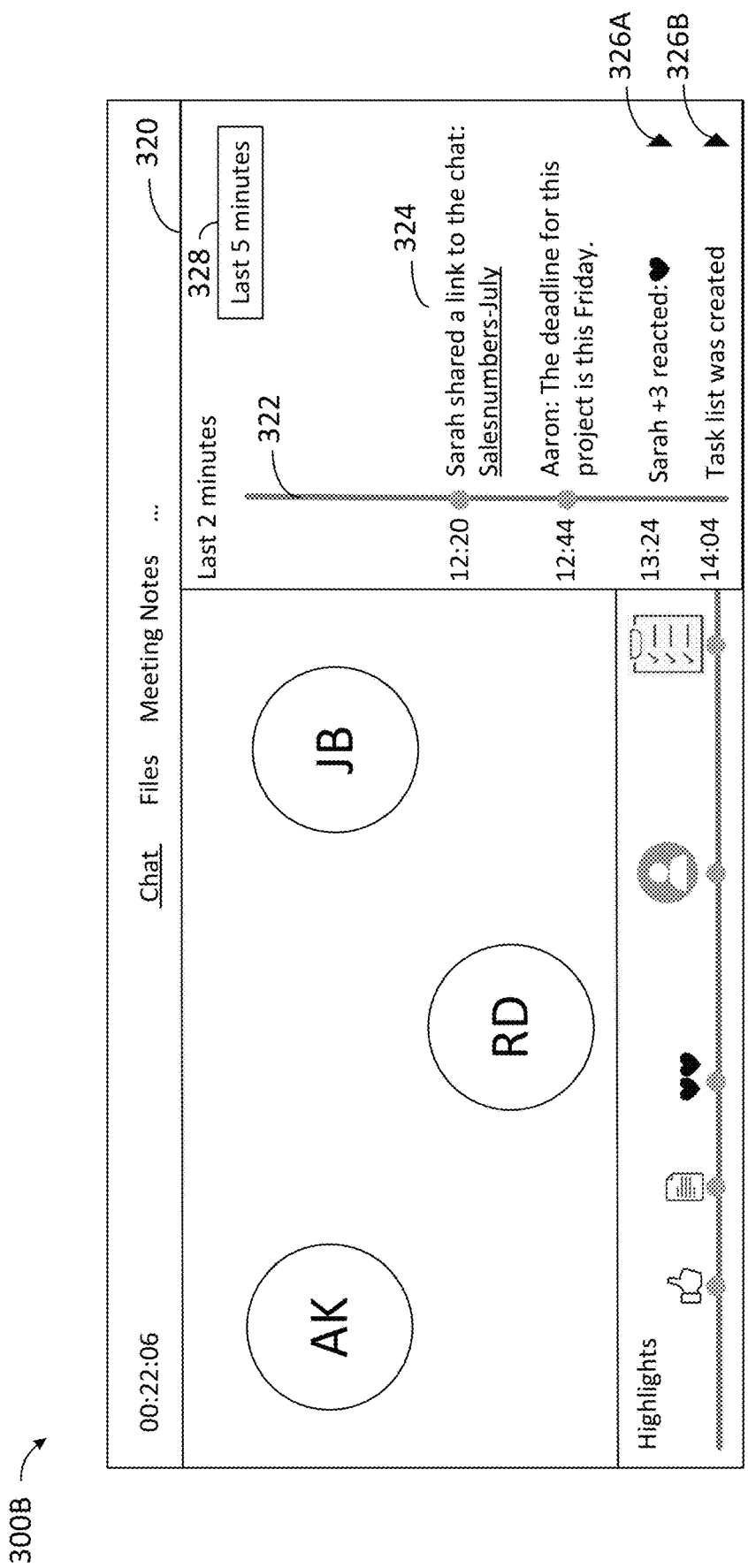

When the user has enabled notification for attentiveness and/or inattentiveness notifications are on by default (e.g., because of importance of a meeting or as set by default settings of an organization), information about the user's activities and/or camera feed may be transmitted to an inattention detection engine to detect inattentiveness for a given time period. Once a user is determined to be inattentive for a period of time that exceeds a given threshold, a notification may be provided to the user. FIGS. 3A-3B depict example GUI screens for providing notifications and meeting summary visualizations to an inattentive user during a meeting. FIG. 3A depicts an example UI element 310 (e.g., a dialogue box) for providing notification of inattentiveness during an ongoing meeting. The UI element 310 may inform the user that they have not been paying attention to the meeting and may provide the amount of time they have been inattentive. The UI element 310 may provide a menu option 312 for returning to the meeting screen directly from the UI element 322. In this manner, the user can quickly return to the meeting screen. The UI element 310 may also provide a menu option 314 for snoozing the notification for a given time period. The time period may be customized and options for its selection may be provided once the user chooses the menu option 314. The UI element 310 may also provide a menu option 316 for ignoring the notification, when the user decides to remain inattentive.

In some implementations, the UI element 310 is displayed on the user's active window to notify the user of their inattentiveness. For example, if the user is working on a document, while the meeting application is in the background, a pop-up menu option may be overlayed on the document the user is working on. In another example, the notification may be presented in a notifications' section of a taskbar displayed on the side or the bottom of the screen. The UI element 310 may be displayed on the meeting application screen, when the meeting screen is active, but the user is looking elsewhere, and/or his head or body movements suggest the user is not paying attention to the meeting.

Once the user resumes paying attention to the meeting, either by utilizing the menu option 312 or by returning their attention to the meeting application screen, a summary visualization of the events missed during the user's inattentiveness may be displayed on the meeting application screen. FIG. 3B displays an example of such a GUI screen.

The GUI screen 300B may include a meeting event visualization pane 320 for displaying a summary of meeting events that occurred during the user's inattentiveness. The visualization pane 320 may display a temporal bar 322 for providing an indication of time at which certain events occurred. The visualization pane 320 may display an indication for each meeting event on the temporal bar 322. The time (relative to the meeting duration) at which each event occurred may be displayed adjacent to the indication. A summary of each event may then be provided adjacent to the displayed time. The summary may provide a brief overview of the meeting event. For example, the summary 324 indicates that the meeting participant identified as Sarah shared a link to the chat feature. The summary 324 also provides a copy of the link shared, such that the user can quickly access the link, if needed. For other types of events, different types of summary information may be provided. For example, when the meeting event is a statement, a copy of the statement may be provided. For some meeting events, for which, more information may be available, a UI element such as the UI elements 326A-326B may be provided to enable access to the additional information about the event.

When the meeting events cannot be displayed within the available space of the visualization pane 320, a scroll bar or similar feature may be provided to enable access to the additional meeting event information. In some implementations, the user may also be able to scroll up to view previous meeting events (e.g., events occurring when the user was still paying attention). It should be noted that while the visualization pane 320 displays more events than the visualization pane 240 of FIG. 2B to provide more information, some determination may still be made with respect to relevance/importance of meeting events displayed in the visualization pane 320. For example, since it is not efficient for the user to read everything that was said during their absence, only statements that are deemed important may be displayed in the visualization pane 320. In this manner, upon returning to the meeting, the user can quickly ascertain what they missed and can begin paying attention again. In some implementation, a menu option 328 is also provided to enable display of meeting event summaries for a given time period (e.g., the time period displayed on the menu option 328). The amount of time may be more or less than the inattentive time period of the user. For example, the menu option 328 may enable display of meeting event summaries for the last 5 minutes. In this manner, if the user was inattentive for a period of time that is longer than 5 minutes and does not have to catch up on everything, they can click on the menu option 328 to be presented with an express view of the last 5 minutes. The menu option may be provided in the visualization pane 320 or may be provided in the top toolbar menu or another place where it is accessible to any meeting participant and not just those who have been inattentive.

Figure 4:
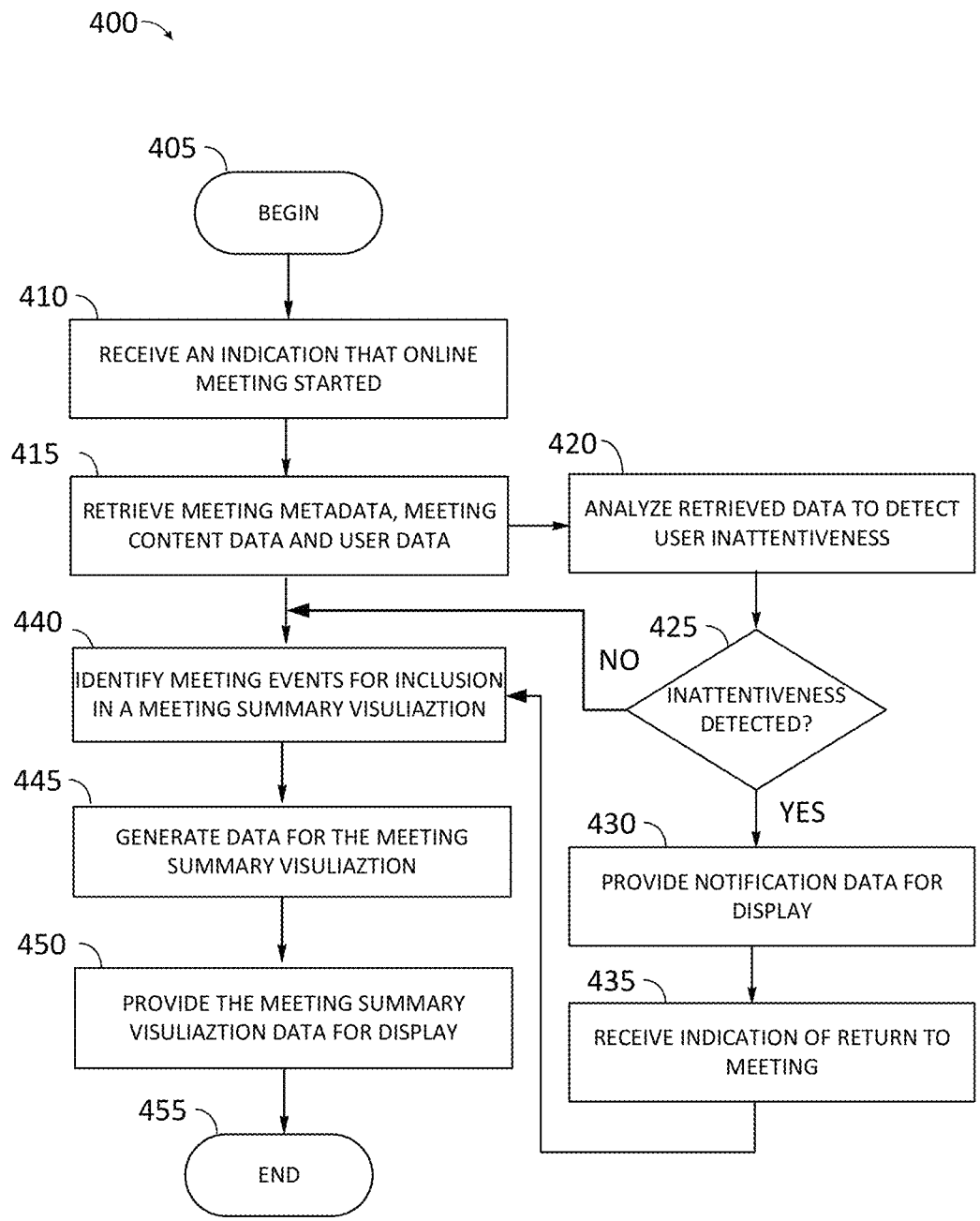
FIG. 4 is a flow diagram depicting an example method for monitoring a meeting, and detecting meeting events and/or detecting meeting participant inattentiveness.

FIG. 4 is a flow diagram depicting an exemplary method 400 for intelligently monitoring a meeting and detecting meeting events and/or detecting meeting participant inattentiveness. One or more steps of the method 400 may be performed by a meeting agent engine such as the meeting agent engine 114 of FIGS. 1A-1B or by an application such as applications 112/134 of FIGS. 1A-1B. The method 400 may begin, at 405, and proceed to receive an indication that an online meeting has started, at 410. This may occur, for example, when an online meeting for which showing meeting highlights is offered or to which a user has subscribed for receiving inattentiveness notification beings. In other implementations, anytime an online meeting begins, an indication about the meeting is received. This enables monitoring all online meetings such that meeting highlights can be displayed quickly after a user request to view them is received. In some implementations, to comply with privacy rules and guidelines, meeting highlights are only displayed to the user, if they have opted-in for this feature of they submit a request to view the meeting highlights during the meeting.

Once the indication is received, the meeting agent may begin monitoring the meeting and/or participant attentiveness in the background. This may be achieved by retrieving one or more of meeting metadata associated with the meeting, meeting content data for the meeting and user data associated with meeting participants, at 415. The received data may then be examined by one or more elements to analyze various aspects of the online meeting. In an example, the retrieved data is provided to an inattentive detection engine. The inattentive detection engine may then analyze the retrieved data to detect a meeting participant's inattentiveness in real-time, at 420. Inattentiveness may be defined as one of the meeting participants not paying attention to the online meeting screen for a period of time exceeding a given threshold. As such, method 400 may proceed to determine if a meeting participant has been inattentive, at 425.

When inattentiveness is detected (YES at 425), method 400 may proceed to provide notification data for display to the inattentive participant, at 430. After providing the notification data, method 400 may proceed to receive an indication of the participant's return to the meeting screen, at 435. Upon receiving this indication or when inattentiveness is not detected (NO at 425), method 400 may proceed to analyze the retrieve data to identify meeting events for inclusion in a meeting summary visualization, at 440. In some implementations, identifying meeting events for inclusion in the meeting summary visualization occurs concurrently with analyzing retrieved data to detect user inattentiveness. In such implementations, indication of meeting participant's return to the meeting is received, method 400 may proceed directly to providing the meeting summary visualization data for display (step 455).

Identifying meeting events may involve analyzing data about the meeting to detect events of importance/relevance during the meeting for inclusion in a summary of the meeting. In some implementations, different parameters may be used for detecting meeting events for a general summary visualization and a detailed summary visualization generated for an inattentive participant. As discussed above, a detailed summary visualization may include more events and may also display more information about each event.

Once meeting events of importance have been detected, method 400 may proceed to generate data for the meeting summary visualization, at 445. This may include creating a list of meeting events, including information about each meeting event (e.g., time of each event, identifying information about the user associated with each event, the type of event, etc.) in the list, and sorting the meeting events in a chronological order. In some implementation, as meeting event detection occurs in real time, as the meeting progresses, more and more meeting events are identified and added to the list of meeting events. As each meeting event is identified, display data for the identified meeting event may be generated. After the meeting summary visualization data is generated, the data may be provided for display, at 450, before method 400 ends, at 455.

Figure 5:
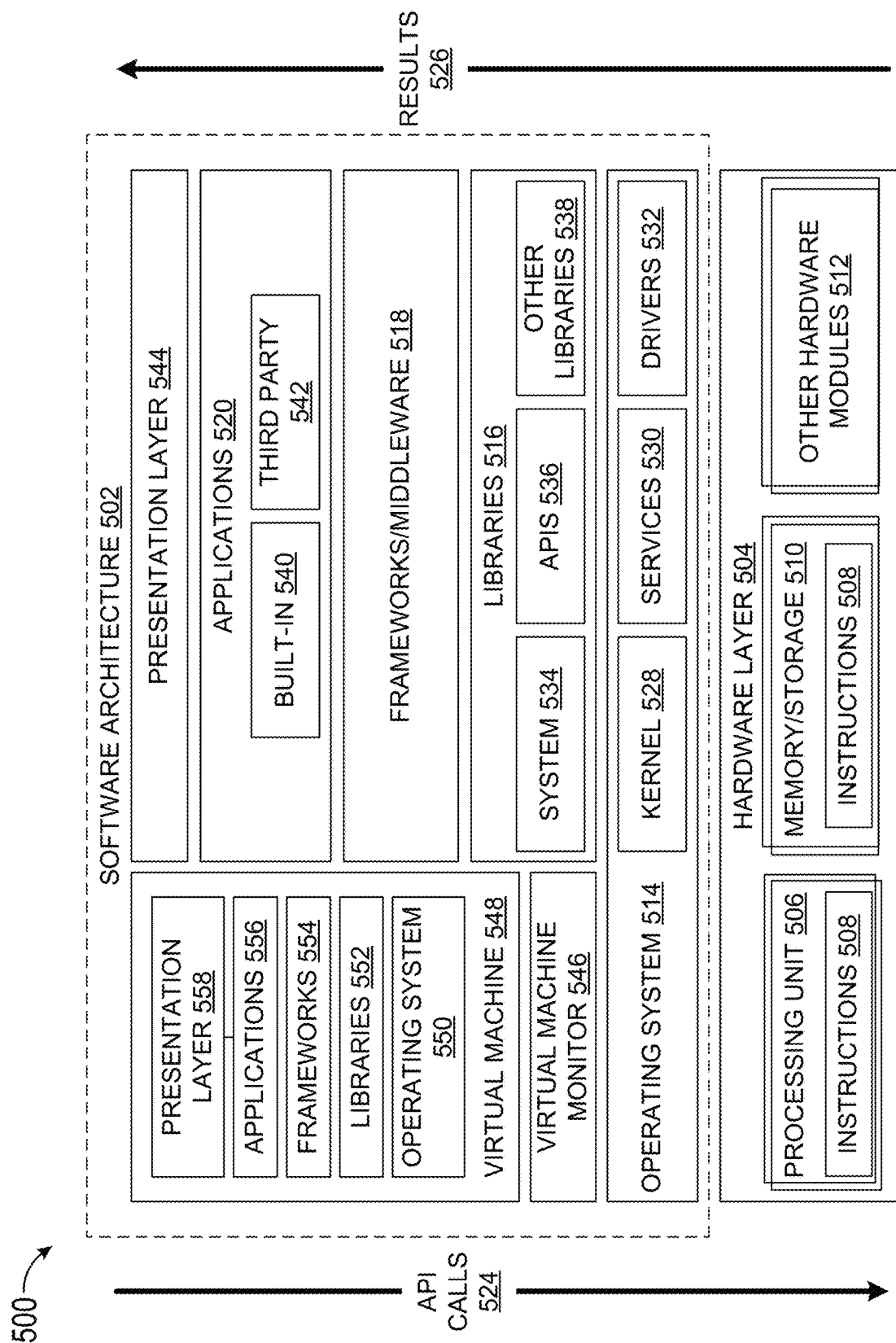
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
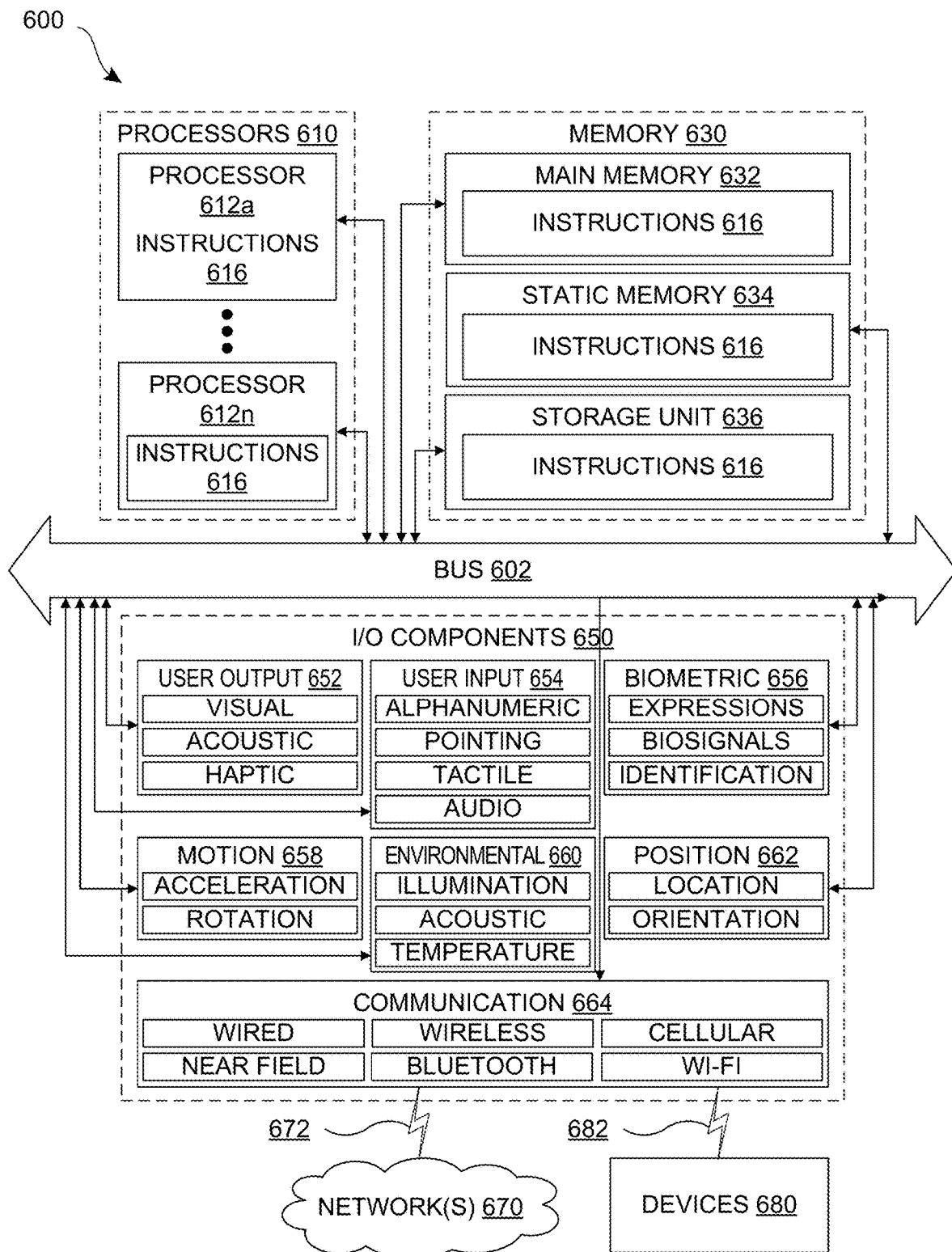
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
    retrieving meeting content data from an ongoing online meeting, meeting metadata associated with the online meeting, and user data associated with one or more participants of the online meeting, the online meeting being conducted via an online meeting application, and the user data including at least one of camera data and data about user interactions with one or more applications other than the online meeting application;
    detecting, based on at least one of the camera data or the data about user interactions with the one or more applications other than the online meeting application, that one of the participants has been inattentive to the online meeting for a time period exceeding a threshold;
    upon detecting that the one of the meeting participants has been inattentive for the time period, providing notification data for display to the one of the meeting participants, the notification data notifying the one of the meeting participant of their inattentiveness;
    in response to providing notification data for display, receiving an indication of the one of the meeting participants return to the online meeting; and
    providing data for displaying a summary of meeting events that occurred during the time period to the one of the meeting participants.

Item 2. The data processing system of item 1, wherein the executable instructions, when executed by the processor, further cause the data processing system to perform functions of:
  analyzing at least one of the meeting content data, meeting metadata, and user data to identify one or more relevant meeting events for inclusion in a meeting summary visualization;
  generating data for the meeting summary visualization; and
  providing the generated data for displaying the meeting summary visualization.

Item 3. The data processing system of item 2, wherein the meeting summary visualization includes a chronological summary of the identified relevant meeting events.

Item 4. The data processing system of item 3, wherein the meeting summary visualization includes a visualization bar for visualizing a time duration of the online meeting and an icon for one or more of the identified relevant meeting events, the icon being displayed adjacent to the visualization bar at a location corresponding to a time at which the identified relevant meeting event associated with the icon occurred.

Item 5. The data processing system of any preceding item, wherein the notification data includes an amount of time of the one participant's inattentiveness.

Item 6. The data processing system of any preceding item, wherein the notification data is provided for display in a user interface element, the user interface element providing at least one of a first menu option for snoozing the notification, and a second menu option for returning to the online meeting application, the first menu option for snoozing the notification temporarily disabling notifications for inattentiveness for the one of the participants.

Item 7. The data processing system of any preceding item, wherein the notification data is provided for display in a user interface element, the user interface element providing a menu option for enabling display of summary of meeting events that occurred during a most recent given time period.

Item 8. The data processing system of any preceding item, wherein the meeting content data includes at least one of audio data from the online meeting, video data from the online meeting, speech to text transcription data from the online meeting, shared documents data from the online meeting, and instant messaging data from the online meeting.

Item 9. The data processing system of any preceding item, wherein the summary of meeting events includes a temporal bar for displaying a time at which each of the meeting events occurred, and information about each of the meeting events.

Item 10. The data processing system of any preceding item, wherein the meeting events include at least one of a meeting participant reaction, a document shared in the online meeting, a task list generated in the online meeting, a message shared via a chat feature of the online meeting, and a statement made by the one or more meeting participants.

Item 11. A method for detecting meeting participant inattentiveness during an online meeting comprising:
  retrieving meeting content data from the ongoing online meeting, meeting metadata associated with the online meeting, and user data associated with one or more participants of the online meeting, the online meeting being conducted via an online meeting application, and the user data including at least one of camera data and data about user interactions with one or more applications other than the online meeting application;
  detecting, based on at least one of the camera data or the data about user interactions with the one or more applications other than the online meeting application, that one of the participants has been inattentive to the online meeting for a time period exceeding a threshold;
  upon detecting that the one of the meeting participants has been inattentive for the time period, providing notification data for display to the one of the meeting participants, the notification data notifying the one of the meeting participant of their inattentiveness;
  in response to providing notification data for display, receiving an indication of the one of the meeting participants return to the online meeting; and
  providing data for displaying a summary of meeting events that occurred during the time period to the one of the meeting participants.

Item 12. The method of item 11, further comprising:
  analyzing at least one of the meeting content data, meeting metadata, and user data to identify one or more relevant meeting events for inclusion in a meeting summary visualization;
  generating data for the meeting summary visualization; and
  providing the generated data for displaying the meeting summary visualization.

Item 13. The method of item 12, wherein the meeting summary visualization includes a visualization bar for visualizing a time duration of the online meeting and an icon for one or more of the identified relevant meeting events, the icon being displayed adjacent to the visualization bar at a location corresponding to a time at which the identified relevant meeting event associated with the icon occurred.

Item 14. The method of any of items 11 and 12, wherein the notification data is provided for display in a user interface element, the user interface element providing at least one of a first menu option for snoozing the notification, and a second menu option for returning to the online meeting application.

Item 15. The method of any of items 11-14, wherein the summary of meeting events includes a temporal bar for displaying a time at which each of the meeting events occurred, and information about each of the meeting events.

Item 16. The method of any of items 11-15, wherein the meeting events include at least one of a meeting participant reaction, a document shared in the online meeting, a task list generated in the online meeting, a message shared via a chat feature of the online meeting, and a statement made by the one or more meeting participants.

Item 17. A data processing system comprising:
  a processor; and
  a memory in communication with the processor, the memory comprising executable instructions that, when executed by the processor, cause the data processing system to perform functions of:
    retrieving meeting content data from an ongoing online meeting, meeting metadata associated with the online meeting, and user data associated with one or more participants of the online meeting;
    identifying in real time, based on at least one of the meeting content data, meeting metadata and the user data, one or more meeting events that occur during the online meeting for inclusion in a meeting summary visualization; and
    generate based on the identified meeting events, display data for displaying the meeting summary visualization,
    wherein the meeting summary visualization includes a visualization bar for visualizing a time duration of the online meeting and an icon for each of one or more identified meeting events, each icon being displayed adjacent to the visualization bar at a location corresponding to a time at which the identified meeting event associated with the icon occurred.

Item 18. The data processing system of item 17, wherein the one or more meeting events are meeting events that are deemed important to the online meeting.

Item 19. The data processing system of items 17 or 18, wherein the meeting events include at least one of a meeting participant reaction, a document shared in the online meeting, a task list generated in the online meeting, a message shared via a chat feature of the online meeting, and a statement made by the one or more meeting participants.

Item 20. The data processing system of any of items 17-19, wherein the meeting summary visualization provides highlights of the meeting and is displayed on a side of the user interface screen for the online meeting.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
retrieving meeting content data from an ongoing online meeting, meeting metadata associated with the online meeting, and user data associated with one or more participants of the online meeting, the online meeting being conducted via an online meeting application, and the user data including at least one of camera data and data about user interactions with one or more applications other than the online meeting application;
detecting, based on the camera data and the data about user interactions with the one or more applications other than the online meeting application, that one of the one or more participants has been inattentive to the online meeting for a time period exceeding a predetermined time period;
anytime the one of the one or more meeting participants is detected as being inattentive for the predetermined time period, providing notification data for display to the one of the one or more meeting participants, the notification data notifying the one of the one or more meeting participants of their inattentiveness;
in response to providing notification data for display, receiving an indication of the one of the one or more meeting participants return to the online meeting; and
providing data for displaying a summary of meeting events that occurred during the time period to the one of the one or more meeting participants.

2. The data processing system of claim 1, wherein the executable instructions, when executed by the processor, further cause the data processing system to perform functions of:
analyzing the meeting content data, meeting metadata, and user data to identify one or more relevant meeting events for inclusion in a meeting summary visualization;
generating data for the meeting summary visualization; and
providing the generated data for displaying the meeting summary visualization.

3. The data processing system of claim 2, wherein the meeting summary visualization includes a chronological summary of the identified relevant meeting events.

4. The data processing system of claim 3, wherein the meeting summary visualization includes a visualization bar for visualizing a time duration of the online meeting and an icon for one or more of the identified relevant meeting events, the icon being displayed adjacent to the visualization bar at a location corresponding to a time at which the identified relevant meeting event associated with the icon occurred.

5. The data processing system of claim 1, wherein the notification data includes an amount of time of the one participant's inattentiveness.

6. The data processing system of claim 1, wherein the notification data is provided for display in a user interface element, the user interface element providing at least one of a first menu option for snoozing the notification, and a second menu option for returning to the online meeting application, the first menu option for snoozing the notification temporarily disabling notifications for inattentiveness for the one of the participants.

7. The data processing system of claim 1, wherein the notification data is provided for display in a user interface element, the user interface element providing a menu option for enabling display of summary of meeting events that occurred during a most recent given time period.

8. The data processing system of claim 1, wherein the meeting content data includes at least one of audio data from the online meeting, video data from the online meeting, speech to text transcription data from the online meeting, shared documents data from the online meeting, and instant messaging data from the online meeting.

9. The data processing system of claim 1, wherein the summary of meeting events includes a temporal bar for displaying a time at which each of the meeting events occurred, and information about each of the meeting events.

10. The data processing system of claim 1, wherein the meeting events include at least one of a meeting participant reaction, a document shared in the online meeting, a task list generated in the online meeting, a message shared via a chat feature of the online meeting, and a statement made by the one or more meeting participants.

11. A method, performed by a data processing system comprising a processor, for detecting meeting participant inattentiveness during an online meeting comprising:
    retrieving meeting content data from the online meeting, via the processor, meeting metadata associated with the online meeting, and user data associated with one or more participants of the online meeting, the online meeting being conducted via an online meeting application, and the user data including at least one of camera data and data about user interactions with one or more applications other than the online meeting application;
    detecting, via the processor, based on the camera data and the data about user interactions with the one or more applications other than the online meeting application, that one of the one or more participants has been inattentive to the online meeting for a time period exceeding a predetermined time period;
    anytime the one of the one or more meeting participants is detected as being inattentive for the predetermined time period, providing notification data for display, on a display screen, to the one of the one or more meeting participants, the notification data notifying the one of the one or more meeting participant participants of their inattentiveness;
    in response to providing notification data for display, receiving an indication of the one of the one or more meeting participants return to the online meeting; and
    providing data for displaying, on the display screen, a summary of meeting events that occurred during the time period to the one of the one or more meeting participants.

12. The method of claim 11, further comprising:
    analyzing the meeting content data, meeting metadata, and user data to identify one or more relevant meeting events for inclusion in a meeting summary visualization;
    generating data for the meeting summary visualization; and
    providing the generated data for displaying the meeting summary visualization.

13. The method of claim 12, wherein the meeting summary visualization includes a visualization bar for visualizing a time duration of the online meeting and an icon for one or more of the identified relevant meeting events, the icon being displayed adjacent to the visualization bar at a location corresponding to a time at which the identified relevant meeting event associated with the icon occurred.

14. The method of claim 11, wherein the notification data is provided for display in a user interface element, the user interface element providing at least one of a first menu option for snoozing the notification, and a second menu option for returning to the online meeting application.

15. The method of claim 11, wherein the summary of meeting events includes a temporal bar for displaying a time at which each of the meeting events occurred, and information about each of the meeting events.

16. The method of claim 11, wherein the meeting events include at least one of a meeting participant reaction, a document shared in the online meeting, a task list generated in the online meeting, a message shared via a chat feature of the online meeting, and a statement made by the one or more meeting participants.

17. A data processing system comprising:
    a processor; and
    a memory in communication with the processor, the memory comprising executable instructions that, when executed by the processor, cause the data processing system to perform functions of:
        retrieving meeting content data from an ongoing online meeting, meeting metadata associated with the online meeting, and user data associated with one or more participants of the online meeting;
        detecting, based on camera data and data about user interactions with one or more applications other than an online meeting application used to conduct the ongoing online meeting, that one of the one or more participants has been inattentive to the online meeting for a time period exceeding a predetermined time period;
        anytime the one of the one or more meeting participants is detected as being inattentive for the predetermined time period, providing notification data for display to the one of the one or more meeting participants, the notification data notifying the one of the one or more meeting participants of their inattentiveness;
        identifying in real time, based on the meeting content data, meeting metadata and the user data, one or more meeting events that occur during the online meeting for inclusion in a meeting summary visualization; and
        generating based on the identified meeting events, display data for displaying the meeting summary visualization,
        wherein the meeting summary visualization includes a visualization bar for visualizing a time duration of the online meeting and an icon for each of one or more identified meeting events, each icon being displayed adjacent to the visualization bar at a location corresponding to a time at which the identified meeting event associated with the icon occurred.

18. The data processing system of claim 17, wherein the one or more meeting events are meeting events that are deemed important to the online meeting.

19. The data processing system of claim 17, wherein the one or more meeting events include at least one of a meeting participant reaction, a document shared in the online meeting, a task list generated in the online meeting, a message shared via a chat feature of the online meeting, and a statement made by the one or more meeting participants.

20. The data processing system of claim 17, wherein the meeting summary visualization provides highlights of the meeting and is displayed on a side of a user interface screen for the online meeting.

* * * * *